US011836034B2

(12) United States Patent
Ulman

(10) Patent No.: US 11,836,034 B2
(45) Date of Patent: Dec. 5, 2023

(54) DETERMINING PROBABLE ROOT CAUSE OF PERFORMANCE ISSUES

(71) Applicant: ENTIT SOFTWARE LLC, Sanford, NC (US)

(72) Inventor: Avi Ulman, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 596 days.

(21) Appl. No.: 16/094,052

(22) PCT Filed: Apr. 22, 2016

(86) PCT No.: PCT/US2016/029035
§ 371 (c)(1),
(2) Date: Oct. 16, 2018

(87) PCT Pub. No.: WO2017/184180
PCT Pub. Date: Oct. 26, 2017

(65) Prior Publication Data
US 2020/0327004 A1 Oct. 15, 2020

(51) Int. Cl.
*G06F 11/07* (2006.01)
*G06F 11/36* (2006.01)
(Continued)

(52) U.S. Cl.
CPC ........ *G06F 11/079* (2013.01); *G06F 11/3636* (2013.01); *H04L 41/0631* (2013.01); *H04L 67/02* (2013.01)

(58) Field of Classification Search
None
See application file for complete search history.

(56) References Cited

U.S. PATENT DOCUMENTS 7,487,407 B2   2/2009   Gehman et al.
7,818,418 B2   10/2010  Bansal et al.
(Continued)

FOREIGN PATENT DOCUMENTS

WO   WO-2004031914 A2   4/2004

OTHER PUBLICATIONS

Cito, J. et al., "Identifying Root Causes of Web Performance Degradation Using Changepoint Analysis," (Research Paper), Apr. 10, 2014, 18 pages, available at http://wp.ifi.ush.ch/preprints/ICWE_Submission13_Camera_Ready.pdf.
(Continued)

*Primary Examiner* — Mohamed A. Wasel
*Assistant Examiner* — Mohammad Yousuf A. Mian
(74) *Attorney, Agent, or Firm* — Sheridan Ross P.C.

(57) ABSTRACT

The present disclosure is to determine a probable root cause of a performance issue. For example, a method can include processing, using a processor, a set of calls for a Hypertext Transfer Protocol (HTTP) transaction wherein individual calls of the set of calls have a set of parameters; and identifying, using the processor, that the HTTP transaction has a performance issue that falls below a predetermined level of a performance metric. Further steps can include separating, using the processor, the set of calls into a first group with the performance issue and a second group without the performance issue; discovering, using the processor, a common subset of parameters among the first group; and determining that the common subset of parameters is a probable root cause of the performance issue if the common subset of parameters is not found in the second group.

20 Claims, 5 Drawing Sheets

(51) Int. Cl.
    *H04L 41/0631*    (2022.01)
    *H04L 67/02*      (2022.01)

(56) References Cited

U.S. PATENT DOCUMENTS

| | | |
|---|---|---|
| 7,992,040 B2 | 8/2011 | Agarwal et al. |
| 9,747,193 B1* | 8/2017 | Reiss ................... G06F 11/3668 |
| 2003/0065986 A1 | 4/2003 | Fraenkel et al. |
| 2008/0235365 A1 | 9/2008 | Bansal et al. |
| 2009/0044053 A1* | 2/2009 | Chandane ........... G06F 11/3612 |
| | | 714/25 |
| 2009/0125496 A1* | 5/2009 | Wexler .............. G06F 16/24553 |
| | | 709/224 |
| 2012/0005658 A1 | 1/2012 | Bansal |
| 2014/0136692 A1 | 5/2014 | Tak et al. |
| 2015/0332147 A1 | 11/2015 | Anastas et al. |
| 2018/0089051 A1* | 3/2018 | Nitsan ................. G06F 11/3495 |

OTHER PUBLICATIONS

International Search Report & Written Opinion received in PCT Application No. PCT/US2016/029035, dated Jan. 11, 2017, 9 pages.

* cited by examiner

DETERMINING PROBABLE ROOT CAUSE OF PERFORMANCE ISSUES

BACKGROUND

In modern computer technology, server computer systems may be used to provide functionality or services for other client computer systems. The server computer system may host data and/or applications such as a website. The client computer system may be able to access and manipulate the data hosted by the server computer system. For example, the server computer system may host a website that is managed by a user and accessed by third party user. The user managing the website may wish to monitor the performance of the website.

DETAILED DESCRIPTION

Figure 1:
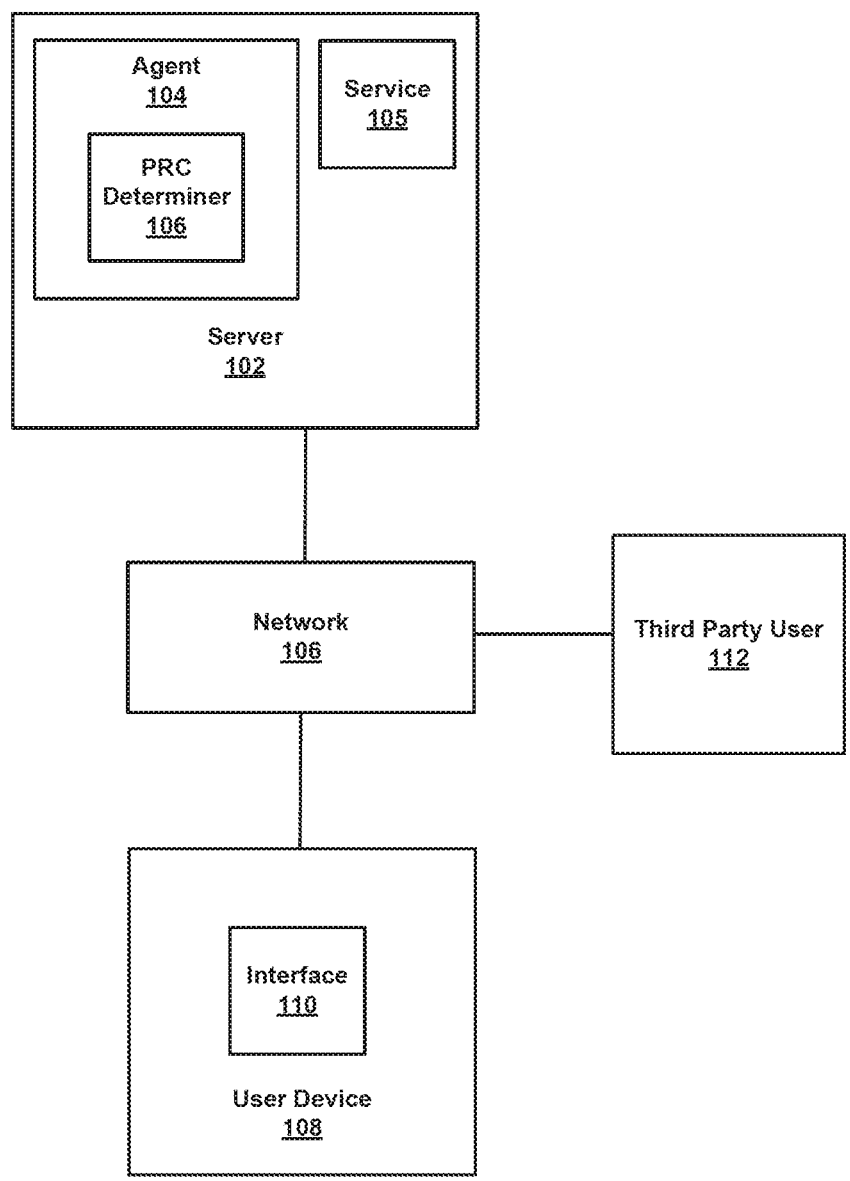
FIG. 1 is a block diagram of an example server and client consistent with the present disclosure.

A computer system, such as a server computer system, can execute applications to host a service or functionality for client computer systems. For example, a server can host a website. In one example, the server can host a service that has a Hypertext Transfer Protocol (HTTP) transaction with HTTP parameters. The server can monitor the performance of the HTTP transaction via an agent installed on the server. The agent can determine that there may be a performance issue, based on performance metrics, for the HTTP transaction. A user responsible for managing the service provided by the server may wish to investigate the root cause of the performance issue so that the root cause can be remedied. In this context or others, a user may experience difficulties tracing the root cause of the performance issue due to too much data related to the values for the performance metrics. Examples of the present disclosure provide technology for discovering a probable root cause of a performance issue. In the present disclosure, the "probable root cause" may be defined to be a suggestion to a user as to what may be causing the performance issue. The user may then take the suggestion to investigate further into the performance issue of the transaction. In some examples, the present disclosure divides a set of calls or instances for the HTTP transaction into multiple groups, e.g., two groups. The groups may be labeled as a first group or as a second group, where the first group has the call with performance issues and the second group has the remainder of the calls or calls with an acceptable level of performance or calls without performance issues. The first group of calls may be searched to discover a common subset of parameters. The second group may then be searched for the same common subset of parameters. If the second group does not have the common subset of parameters then the common subset of parameters may be determined to be a probable root cause of the performance issue and the user may be notified. If the second group does have the common subset of parameters, then the common subset of parameters may not be the probable root cause and further steps may be taken to determine the probable root cause.

A "parameter," including a common subset of parameters, can be defined to include a parameter of an HTTP transaction and may be user defined. To illustrate by example, the parameter may be a request parameter and the individual calls in the set of calls for an HTTP transaction may have a plurality of parameters including different combinations of parameters. For example, a parameter for an HTTP transaction may be a "category" or a "query," and a combination of parameters may be related thereto, e.g., "category, sort" or "query, color" or "query, language" etc. In one example, HTTP header fields can be components of the header section of request and response messages in the HTTP and define the operating parameters of an HTTP transaction.

A further step can include searching and discovering that the first group has a common attribute value. If the second group does not contain the common attribute value, then the common attribute value may be determined to be the probable root cause of the performance issue and the user may be notified. If the common attribute value is found in the second group, then the common attribute value may not be the probable root cause. It is noted that an "attribute" for a call, including a common attribute value, may refer to a specific value and is different than a more general parameter for an HTTP transaction. For example, the common attribute value may include a value for a long name, a long word value, a long value, a date value, a range value, a number value, a color value, a Boolean value, and/or a language value. To illustrate by example, calls in the first group with performance issues may contain properties or a common attribute with a specific value, e.g., value expressed in Japanese. If the second group without performance issues does not have common attributes with the specific value, e.g., the specific language at issue such as Japanese, then the probable root cause of the performance issue may be the common attribute with values related to that specific language. A user may then be notified that the probable root cause may be in how the HTTP transaction is dealing with the common attributes with values in the specific language. Likewise, as mentioned, other more specific attributes may be the cause of the performance issue other than language, e.g. Japanese in the above example. As mentioned, the performance issue may be caused by number value or range of number values, a long word or long name value, a date or date range value, a Boolean word grouping value, a specific color value, e.g., blue, etc.

One example of an environment for discovering the probable root cause of a performance issue is shown in FIG. 1. FIG. 1 depicts a server 102 which is a server computer system used to host functionality and services, such as a service 105, over a network 106 for other client devices such as a user device 108 and a third party user 112. It should be appreciated that the server 102 may be a single server computer system or may include a plurality of server computer systems such as a server farm or a cloud computing service. The server 102 may include a processor and memory for executing applications, software, or other services. The server 102 may have multiple frontend and backend application servers. The service 105 may include applications executed by server 102. In one example, the service 105 can include a website executed by the server 102. The service 105 may have an HTTP transaction that may include a set of calls or instances for executing the service or functionality. An agent 104 may be executed using server 102 to monitor the performance of the service 105. For example, the agent 104 can be described as an application performance management that provides visibility into what happens on the server side through detailed metrics, topology layers, exceptions and Structured Query Language (SQL) breakdowns, down to the line of code or log message. The agent 104 may analyze transaction instances and automatically traces the transactions across multiple frontend as well as backend application servers, providing a quality triage dashboard that assists in measuring, isolating and analyzing production environment issues with ease.

In one example, a user of the user device 108 may be responsible for monitoring the performance of service 105 such that service 105 runs smoothly and may be able to be used by third party users and devices such the third party user 112. The agent 104 may serve to notify user device 108 when a problem occurs such as a performance issue so that the user may investigate and ultimately remedy the root cause of the performance issue. The agent 104 can provide tools to show the user of user device 108 performance metrics that can be calculated over server 102 and network 106. However, the user may need additional assistance for investigation into the probable root cause. For example, the agent 104 may display all the performance metrics by grouping them by the HTTP Request's uniform resource locator (URL). In so doing, there may be no difference on a user interface (UI) between the transaction's calls except its timestamp and the performance metrics. If the problem of the transaction happened only when some of the URL parameters have specific values, or when specific parameters exist on the URL, it will be difficult to the user to discover the root cause.

Additionally, in one scenario, a URL may not define only one transaction because the server 102 calls different service for every parameter's value. In an example where the URL calls the same service, the URL can define the transaction. In such an example, the user may want to consider it as one transaction for all the performance monitors without breaking the transaction to many transactions. Moreover, the agent 104 may allow the user to configure the agent 104 to send the URL's parameters. Then, the HTTP parameters of calls will be displayed. In this example, the user may receive too much data that creates difficulty to find which parameter(s) may be the root cause.

The present disclosure overcomes these issues by providing the agent 104 with PRC determiner 106 which may automatically discover a probable root cause of a performance issue which may be sent to the user device 108 and displayed in the interface 110. In other words, the present disclosure describes systems and techniques for automatically help the user understand a probable root cause without the user having to sort through the vast amount of data related to a performance issue. The steps that PRC determiner 106 may use to determine the probable root cause are depicted and described in reference to FIGS. 2-4.

Figure 2:
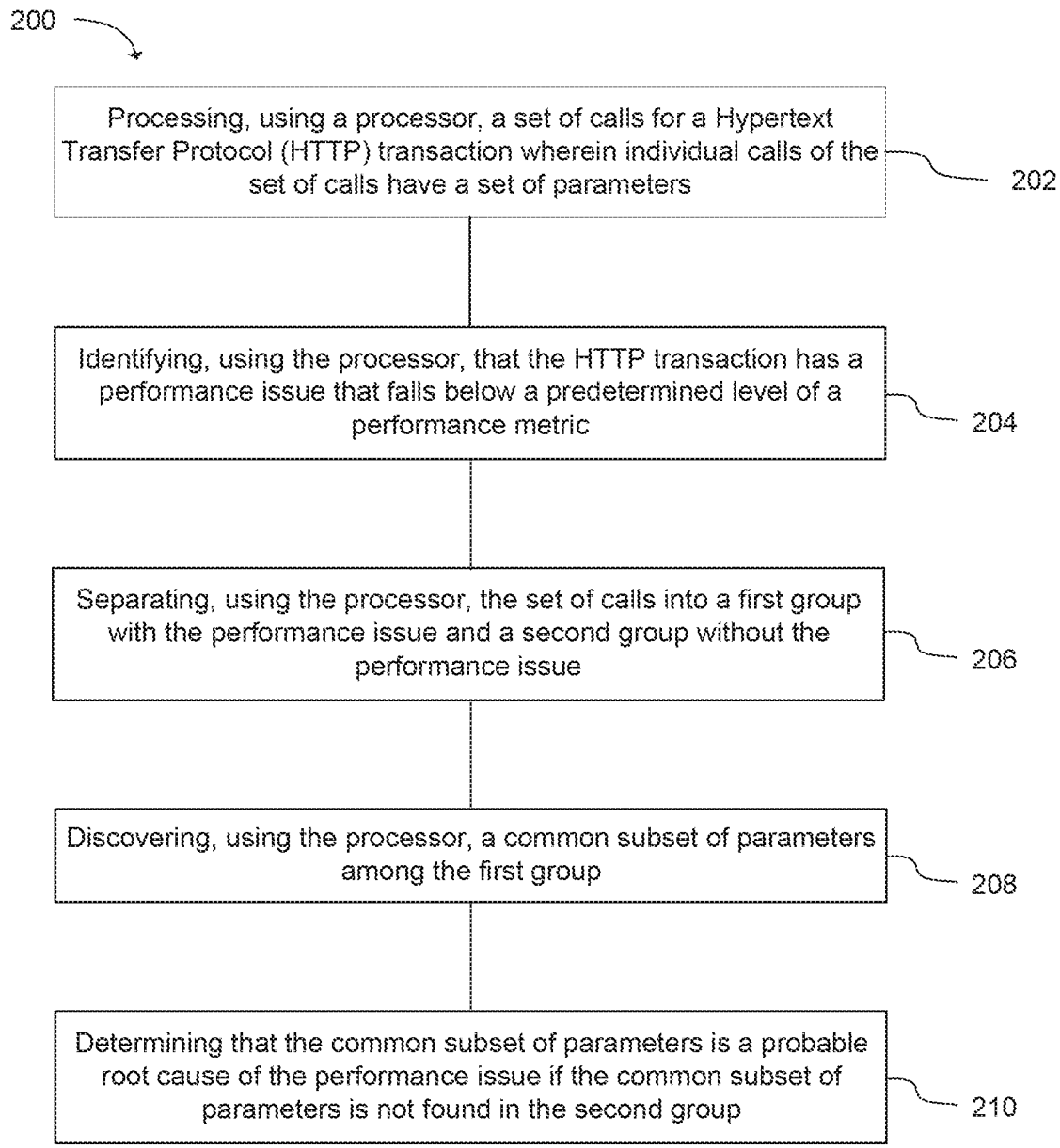
FIG. 2 is a flow chart of an example method to determine a probable root cause of a performance issue consistent with the present disclosure.

FIG. 2 is a flowchart of one example of a method 200 to determine a probable root cause of a performance issue. In one example, method 200 is carried out by a processor(s) and/or electrical user interface controls under the control of computer readable and computer executable instructions stored on a computer-usable storage medium. The computer readable and computer executable instructions reside, for example, in data storage features such as computer usable volatile and non-volatile memory which may be non-transitory. The non-transitory computer readable and computer executable instructions may reside in any type of computer-usable storage medium. In one example, method 200 can be performed by the devices of FIGS. 1 and/or 5. For example, steps 202-210 may be carried out by the agent 104 and PRC determiner 106 on the server 102 of FIG. 1.

Method 200 may be described a method, process, or flow for discovering a probable root cause of a performance issue. This may also be referred to as determining a hypothesis of a root cause for a performance issue. The probable root cause or the hypothesis may be sent to user responsible for the functionality of service to further investigate and ultimately remedy the performance issue.

The method can include processing 202, using a processor, a set of calls for a Hypertext Transfer Protocol (HTTP) transaction wherein individual calls of the set of calls have a set of parameters. For example, the processor may refer to a processor of server 102 of FIG. 1. The set of calls may be instances all related to a single transaction. In one example, the set of calls may be related to more than one transaction. The set of parameters for the calls may be HTTP parameters. In one example, the parameters may be set by a user or user defined.

Identifying 204, using the processor, that the HTTP transaction has a performance issue that falls below a predetermined level of a performance metric. For example, the predetermined level of the performance metric may be based on speed or response time of the calls. In one example, the two millisecond time may be determined to be an average or good response time for a transaction while the 10 millisecond time considered slow. Therefore, the predetermined level of the performance metric would be set at 10 milliseconds such that every call that took 10 milliseconds or longer would be determined to have a performance issue. This may be monitored by the agent 104. In one example, the agent 104 monitors all calls and automatically determines an average call time and sets the predetermined level for the performance metric of time.

Another step can include separating 206, using the processor, the set of calls into a first group with the performance issue and a second group without the performance issue. In one example, the first group may be referred to as the bad group and the second group may be referred to as the good group (or negative and positive, or any other label differentiating less desired groups compared to desired groups). These relative terms, such as "good/bad" or "positive/negative," are used only for convenience to describe that the first group includes may be a problematic group and the second group can be a group without a problematic performance issue. The second group may include the remainder of the calls or the calls with an acceptable level of performance meaning that the calls of the second group may not be without any performance issue, but may not have the same performance issue as the calls in the first group.

At 208, discovering, using the processor, a common subset of parameters among the first group. In one example, the discovering automatically traces the set of calls for the HTTP transaction across multiple frontend and backend application servers.

Another step can include determining 210 that a common subset of parameters may be a probable root cause of the performance issue if the common subset of parameters is not found in the second group.

An additional step can include notifying a user of the probable root cause. The user may be notified via interface 110 using the user device 108. In one example, the method 200 may be executed more than once to provide more than one probable root cause based on the common subset of parameters to the user.

If the common subset of parameters is found in the second group, then the common subset of parameters may not be determined to be the probable root cause and further investigation is required. The further investigation may be the additional step of searching for a common attribute value among the first group if the common subset of parameters is found in the second group; and determining that the common attribute value is a probable root cause of the performance issue if the common attribute value is not found in the second group. The common attribute value may be a long name value, a long word value, a long value, a date value, a range value, a number value, a Boolean value, a color value, or a language value, for example. Other common attribute values other than these can also be used in accordance with examples of the present disclosure.

Figure 3:
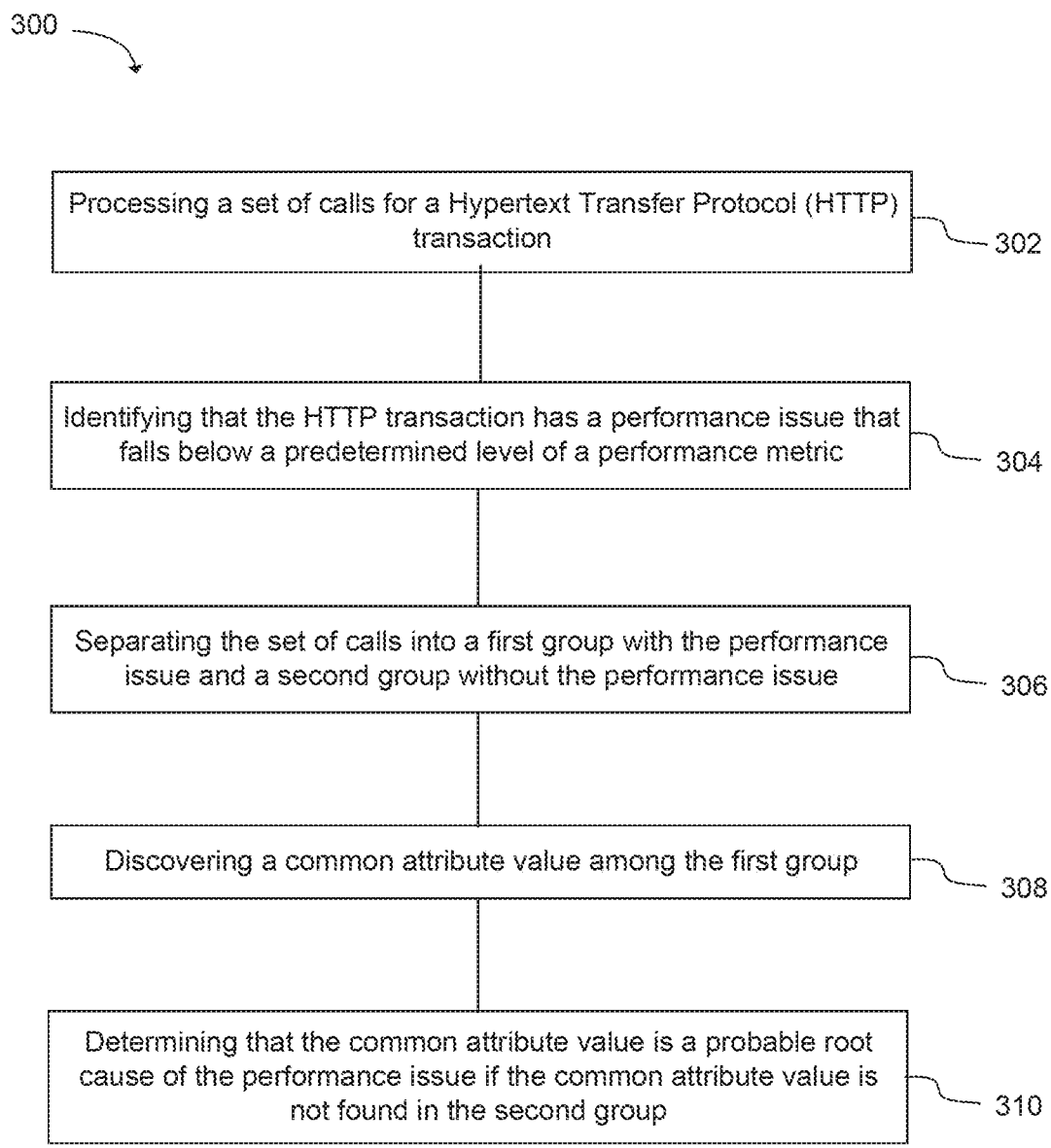
FIG. 3 is a flow chart of an example method to determine a probable root cause of a performance issue consistent with the present disclosure.

FIG. 3 is a flowchart of one example of a method 300 to determine a probable root cause of a performance issue. In one example, method 300 is carried out, in part or in full, by processors and electrical user interface controls under the control of computer readable and computer executable instructions stored on a computer-usable storage medium. The computer readable and computer executable instructions reside, for example, in data storage features such as computer usable volatile and non-volatile memory and may be non-transitory. However, the non-transitory computer readable and computer executable instructions may reside in any type of computer-usable storage medium. In one example, method 300 can be performed by devices in FIGS. 1 and/or 5. For example, steps 302-310 may be carried out by the agent 104 and PRC determiner 106 on the server 102 of FIG. 1.

Method 300 may be described a method, process, or flow for discovering a probable root cause of a performance issue. This may also be referred to as determining a hypothesis of a root cause for a performance issue. The probable root cause or the hypothesis may be sent to user responsible for the functionality of service to further investigate and ultimately remedy the performance issue.

The method can include processing 302 a set of calls for a Hypertext Transfer Protocol (HTTP) transaction. For example, the processor may refer to a processor of server 102 of FIG. 1. The set of calls may be instances all related to a single transaction. In one example, the set of calls may be related to more than one transaction.

The method can include identifying 304 that the HTTP transaction has a performance issue that falls below a predetermined level of a performance metric. The method can further include separating 306 the set of calls into a first group with the performance issue and a second group without the performance issue.

The method can further include discovering 308 a common attribute value among the first group. The common attribute value may a long name value, a long word value, a long value, a date value, a range value, a number value, a Boolean value, a color value, or a language value, for example. The step of discovering 308 may be repeated a plurality of times when searching for a different common attribute value until a common attribute value is found.

The method can further include determining 310 that the common attribute value is a probable root cause of the performance issue if the common attribute value is not found in the second group.

In one example, for the attributes, the method may include checking if there is property that answers to that attribute in every call in the first group. For example, for attribute long name, the method may include checking that in every call there may be a property that has a long name. The definition of long name is that the name's length bigger than predefined threshold. Then, if one of the calls with a long name is not found, the method may include moving on to the next attribute which may be a long word value or a long value, for example. Again, the method can be used to check if all the calls have property with value that its length bigger than predefined threshold, and so on. For attribute date, the method may include checking if all calls have a property that may have a value represented date. For attribute range, the method may include checking if there is a property in every call that represents a range of dates. For attribute number, the method can include checking if there is a property in every call that its value is a number.

In one example, the method 300 may find that a number may be a common attribute value for the first group. Then, the method can include checking if there a call in the second group that may have a property with the numerical value. If so, the method may include recognizing if there may be a difference between the numerical properties from the first group and the numerical properties from the second group. For example, in one group the number type may be integer while in the other group may be float. Or, in one of the groups the numbers may be considerably bigger from the other group. Or, in one of the groups the numbers may be negative while in the other group they positive. If the method has lead to discovering or finding any considerable difference, it may be assumed that the attribute number is not the root cause, thus continuing to the next attribute in the collection.

An additional step can include notifying a user of the probable root cause. The user may be notified via interface 110 using the user device 108. In one example, the method can be carried out or executed more than once to provide more than one probable root cause based on the common attribute value to the user. The user may also be provided with a probable root cause based on a common subset of parameters as well as a probable root cause based on a common attribute value.

Additional steps may precede 308 including the steps of discovering a common subset of parameters among the first group; and determining that the common subset of parameters is a probable root cause of the performance issue if the common subset of parameters is not found in the second group.

Figure 4:
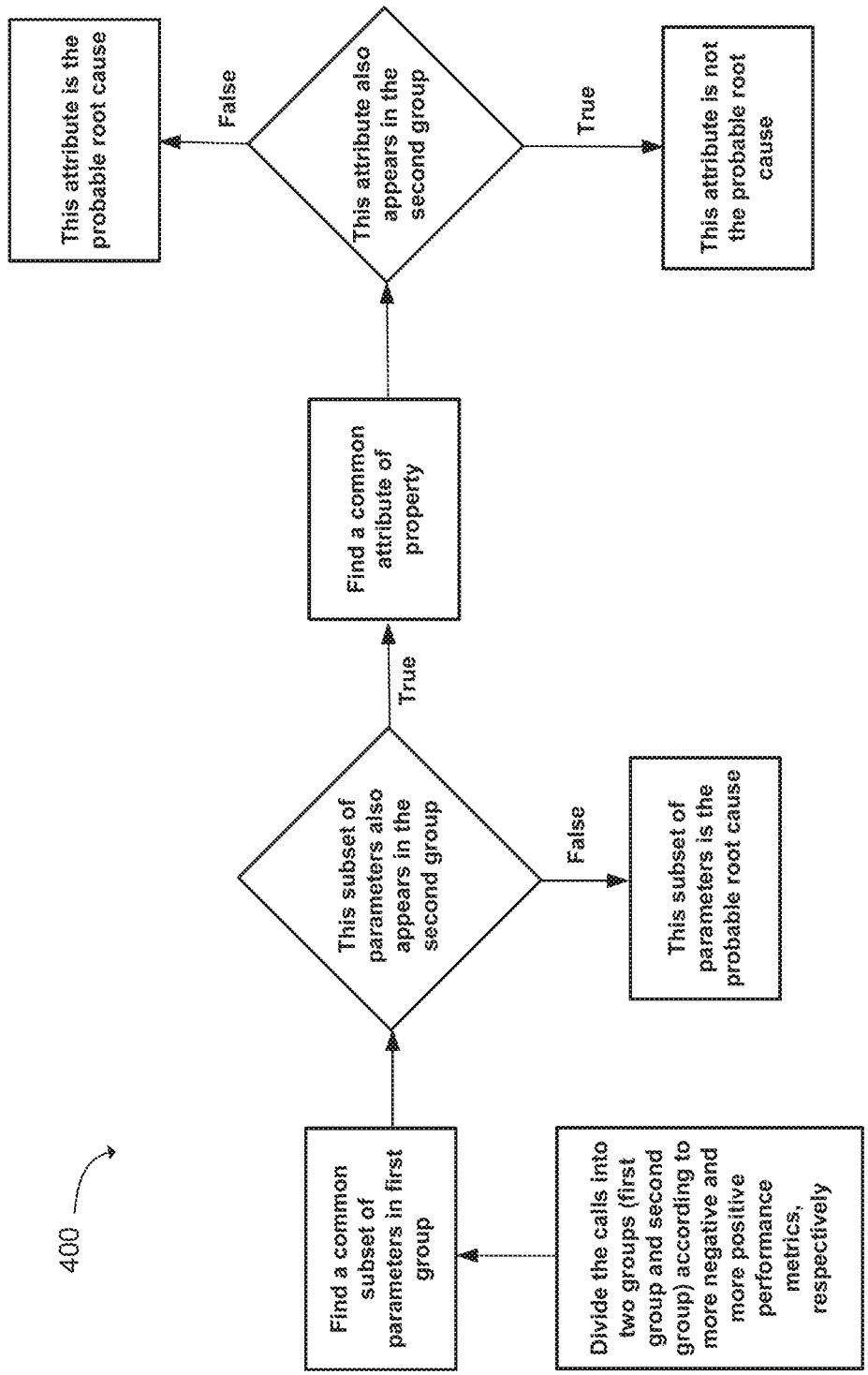
FIG. 4 is a flow chart of an example method to determine a probable root cause of a performance issue consistent with the present disclosure.

FIG. 4 is a flowchart of one example of a method 400 to determine a probable root cause of a performance issue. The method may be described as a combination of method 200 of FIG. 2 and method 300 of FIG. 3.

In one example, a service can be hosted by the server at a web site, such as www.mywarehouse.com. Table 1 shows calls to the web site page in a 30 minute period and the response latency for the calls.

TABLE 1

| Http URL | Response Latency |
|---|---|
| http://www.mywarehouse.com/stock-report?Category=Appliances&Sort=no | $10_{ms}$ |
| http://www.mywarehouse.com/stock-report?Category=Furniture&Sort=yes | $324_{ms}$ |
| http://www.mywarehouse.com/stock-report?Category=Shoes&Sort=no | $9_{ms}$ |
| http://www.mywarehouse.com/stock-report?Category=Toys&Sort=no | $15_{ms}$ |
| http://www.mywarehouse.com/stock-report?Category=Books&Sort=yes | $292_{ms}$ |
| http://www.mywarehouse.com/stock-report?Category=Appliances&Sort=yes | $211_{ms}$ |
| http://www.mywarehouse.com/stock-report?Category=Office-Supplies&Sort-no | $13_{ms}$ |
| http://www.mywarehouse.com/stock-report?Category=Weapons&Sort=no | $8_{ms}$ |
| http://www.mywarehouse.com/stock-report?Category=Gadgets&Sort=yes | $361_{ms}$ |
| http://www.mywarehouse.com/stock-report?Category=Furniture&Sort=yes | $303_{ms}$ |
| http://www.mywarehause.com/stock-report?Category=Office-Supplies&Sort=no | $9_{ms}$ |

To apply method 400 to Table 1, the calls for Table 1 can be divided into two groups by sorting them according to response latency and then, finding the 'jump' in the values. In this example the 'jump' is between $15_{ms}$ and $211_{ms}$. Table 2 shows the calls after the division:

TABLE 2

| Http URL | Response's Latency |
|---|---|
| Second Group (calls without performance issue) | |
| http://www.mywarehouse.com/stock-report?Category= Weapons&Sort=no | $08_{ms}$ |
| http://www.mywarehouse.com/stock-report?Category= Shoes&Sort=no | $09_{ms}$ |
| http://www.mywarehouse.com/stock-report?Category=Office-Supplies&Sort=no | $09_{ms}$ |
| http://www.mywarehouse.com/stock-report?Category= Appliances&Sort=no | $10_{ms}$ |
| http://www.mywarehouse.com/stock-report?Category=Office-Supplies&Sort=no | $13_{ms}$ |
| http://www.mywarehouse.com/stock-report?Category= Toys&Sort=no | $15_{ms}$ |
| First Group (calls with performance issue) | |
| http://www.mywarehouse.com/stock-report?Category= Appliances&Sort=yes | $211_{ms}$ |
| http://www.mywarehouse.com/stock-report?Category=Books&Sort=yes | $292_{ms}$ |
| http://www.mywarehouse.com/stock-report?Category= Furniture&Sort=yes | $303_{ms}$ |
| http://www.mywarehouse.com/stock-report?Category= Furniture&Sort=yes | $324_{ms}$ |
| http://www.mywarehouse.com/stock-report?Category=Gadgets&Sort=yes | $361_{ms}$ |

An additional step can include finding the common subset of properties in group the first group. In this example, the subset may be "Category, Sort." This parameter subset also appears in calls from the second group. Therefore this subset may not be the probable root cause.

A third step may include finding a common attribute property or a common attribute value. In this specific example, the common attribute may be that the property 'Sort' contains the value 'yes.' That property may also exist in calls from the second group, but it may not share the same attribute. The values of 'sort' in the second group may not be equal to 'yes.'

So, method 400 can be used to notify the user that the root cause may be the property 'sort' whenever its value equals to 'yes.' There are other more specific attribute values other than 'yes' or 'no,' as this is provided by example only. For example, the attribute may be a specific color, a specific number, a number range, a word, as well as other attributes listed herein.

In a different example, the service hosted by the server may be a web site such as www.buyme.com. Table 3 shows calls to the web site page in a 30 minute period and the CPU Usage for the calls.

TABLE 3

| Http URL | CPU Usage |
|---|---|
| http://www.buyme.com/search?Query=Camera&Brand=Canon&Type=Reflex | $13_{\%}$ |
| http://www.buyme.com/search?Query=Bicycle&Color=Black&Type=Cruiser | $90_{\%}$ |
| http://www.buyme.com/search?Query=Xbox | $16_{\%}$ |
| http://www.buyme.com/search?Query= Watch&Brand=Rolex | $21_{\%}$ |
| http://www.buyme.com/search?Query=Smartphone&Brand=Apple&Color=Gold | $88_{\%}$ |
| http://www.buyme.com/search?Query=Camera&Color=Silver | $72_{\%}$ |
| http://www.buyme.com/search?Query=Bicycle&Brand=Shimano | $19_{\%}$ |
| http://www.buyme.com/search?Query=Necklace | $26_{\%}$ |
| http://www.buyme.com/search?Query=Watch&Color=Purple | $98_{\%}$ |
| http://www.buyme.com/search?Query=Smartphone&Brand=LG&Color=Gold | $92_{\%}$ |
| http://www.buyme.com/search?Query=Camera&Brand=Nikon&Type=Underwater | $19_{\%}$ |

To apply method 400 to Table 3, steps can include dividing the calls into two groups by sorting them according to CPU Usage and then, finding the 'jump' in the values. In this example, the 'jump' may be identified to be between $26_\%$ and $72_\%$. Table 4 shows the calls after the division.

TABLE 4

| Http URL | CPU Usage |
|---|---|
| *Second Group (calls without performance issue)* | |
| http://www.buyme.com/search?Query=Camera&Brand=Nikon&Type=Underwater | $13_\%$ |
| http://www.buyme.com/search?Query=Xbox | $16_\%$ |
| http://www.buyme.com/search?Query=Bicycle&Brand-Shimano | $19_\%$ |
| http://www.buyme.com/searchQuery=Camera&Brand=Canon&Type=Reflex | $19_\%$ |
| http://www.buyme.com/search?Query=Watch&Brand=Rolex | $21_\%$ |
| http://www.buyme.com/search?Query=Necklace | $26_\%$ |
| *First Group (calls with performance issue)* | |
| http://www.buyme.com/search?Query=Camera&Color=Silver | $72_\%$ |
| http://www.buyme.com/search?Query=Smartphone&Brand=Apple&Color=Gold | $88_\%$ |
| http://www.buyme.com/search?Query=Bicycle&Color=Black&Type=Cruiser | $90_\%$ |
| http://www.buyme.com/search?Query=Smartphone&Brand=LG&Color=Gold | $92_\%$ |
| http://www.buyme.com/search?Query=Watch&Color=Purple | $98_\%$ |

Another step of method 400 can include finding a common subset of properties in the first group. In this example, the subset may be 'Color.' This subset does not appear on calls from the second group. So, the method can include notifying the user that the root cause may be the property 'Color.' As a note, if the subset property "Color" is not found to be the subset of parameters that identifies the probably root cause, a common attribute may be discovered in additional steps, which may be a specific color, for example.

Figure 5:
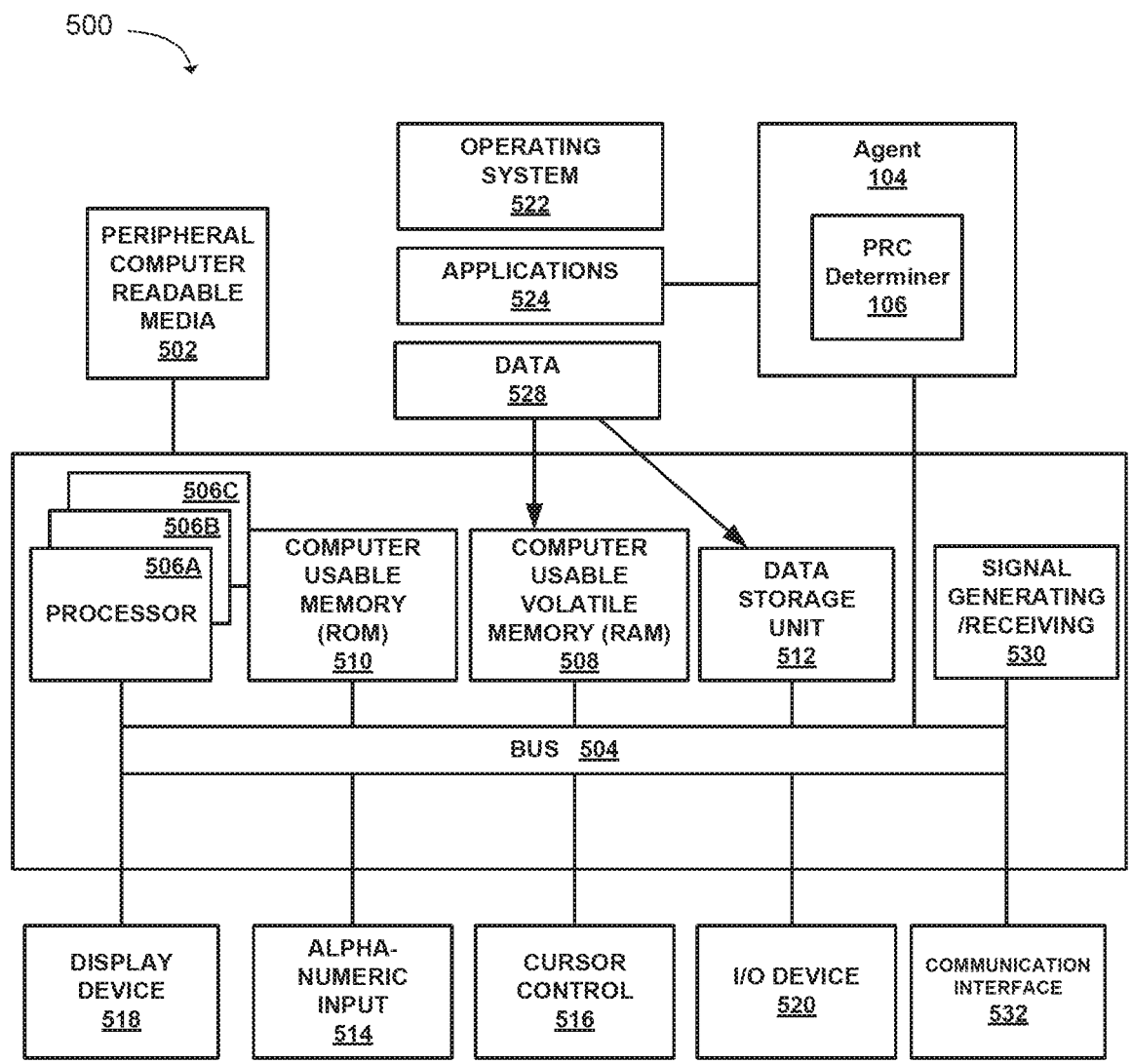
FIG. 5 is a block diagram of an example computing system consistent with the present disclosure.

With reference now to FIG. 5, portions of the disclosure for providing a communication pathway composed of non-transitory computer-readable and computer-executable instructions that reside, for example, in computer-usable media of a computer system, are disclosed FIG. 5 illustrates one example of a type of computer that can be used to implement examples of the present disclosure. For example, either the server 102 or the user device 108 of FIG. 1 may be a computer system such system 500. The server 102 or the user device 108 of FIG. 1 may have some, all, or none of the components and features of system 500.

FIG. 5 illustrates an example computer system 500 used in accordance with examples of the present disclosure. It is appreciated that this system is an example only and that the present disclosure can operate on or within a number of different computer systems including general purpose networked computer systems, embedded computer systems, routers, switches, server devices, user devices, various intermediate devices/artifacts, standalone computer systems, mobile phones, personal data assistants, televisions and the like. As shown in FIG. 5, computer system 500 of FIG. 5 can be adapted having peripheral computer readable media 502 such as, for example, a floppy disk, a compact disc, a hard drive, a solid state drive, magnetic media, or the like, coupled thereto.

System 500 of FIG. 5 can include an address/data bus 504 for communicating information, and a processor 506A coupled to bus 504 for processing information and instructions. As depicted in FIG. 5, system 500 may be well suited to a multi-processor environment in which a plurality of processors 506A, 506B, and 506C may be present. Conversely, system 500 is also suited to having a single processor such as, for example, processor 506A. Processors 506A, 506B, and 506C may be any of various types of microprocessors. Either of such arrangements is still considered to be "a processor" in accordance with examples of the present disclosure, whether there is a single process or multiple processors. System 500 also may include data storage features such as a computer usable volatile memory 508, e.g. random access memory (RAM), coupled to bus 504 for storing information and instructions for processors 506A, 506B, and 506C.

System 500 also may include a computer usable non-volatile memory 510, e.g., read only memory (ROM), coupled to bus 504 for storing static information and instructions for processors 406A, 406B, and 406C. A data storage unit 512 (e.g., a magnetic or optical disk and disk drive) may also be present and may be coupled to bus 504 for storing information and instructions. System 500 also may include an alpha-numeric input device 514 including alphanumeric and function keys coupled to bus 504 for communicating information and command selections to processor 506A or processors 506A, 506B, and 506C. System 500 also may include a cursor control device 516 coupled to bus 504 for communicating user input information and command selections to processor 506A or processors 506A, 506B, and 506C. System 500 of the present example also can include a display device 518 coupled to bus 504 for displaying information.

Referring still to FIG. 5, a display device 518 may be present, such as a liquid crystal device, cathode ray tube, plasma display device or other display device suitable for creating graphic images and alpha-numeric characters recognizable to a user. A cursor control device 516 can also be present and may allow the computer user to dynamically signal the movement of a visible symbol (cursor) on a display screen of display device 518. In one example, system 500 may include the user device 108 of FIG. 1 and the display device 518 can display interface 118 which can be used to notify a user of a probable root cause of a performance issue. Many implementations of cursor control device 516 may be used, such as a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands, among others.

System 500 can also include a cursor directed by other methods such as, for example, voice commands. System 500 also may include an I/O device 520 for coupling system 500 with external entities. For example, in one example, I/O device 520 can include a modem for enabling wired or wireless communications between system 500 and an external network such as, but not limited to, the Internet. A more detailed discussion of the present disclosure is found below.

Referring still to FIG. 5, various other components are depicted for system 500. Specifically, when present, an operating system 522, applications 524, and data 528, as shown, can typically reside with one or some combination of computer usable volatile memory 508, e.g. random access memory (RAM), and data storage unit 512. However, it is appreciated that in some examples, operating system 522 may be stored in other locations such as on a network or on a flash drive; and that further, operating system 522 may be accessed from a remote location via, for example, a coupling to the internet. In one example of the present disclosure, system 500 may include the server 102 of FIG. 1 and may include agent 104 and PRC determiner 106, which can be in direct contact with bus 504 or can be stored as an application 524 in memory locations within RAM 508 and memory areas within data storage unit 512. A method of physical proximity security may be applied to operating system 522, applications 524, and/or data 528.

System 500 also may include signal generating and receiving device(s) 530 coupled with bus 504 for enabling system 500 to interface with other electronic devices and computer systems. Signal generating and receiving device(s) 530 of the present example may include wired serial adaptors, modems, and network adaptors, wireless modems, and wireless network adaptors, and other such communication disclosure. The signal generating and receiving device(s) 530 may work in conjunction with communication interface(s) 532 for coupling information to and/or from system 500. Communication interface 532 may include a serial port, parallel port, Universal Serial Bus (USB), Ethernet port, antenna, or other input/output interface. Communication interface 532 may physically, electrically, optically, or wirelessly (e.g. via radio frequency) couple system 500 with another device, such as a cellular telephone, radio, or computer system.

The computing system 500 is only one example of a suitable computing environment and is not intended to suggest any limitation as to the scope of use or functionality of the present disclosure. Neither should the computing environment 500 be interpreted as having any dependency or requirement relating to any one or combination of components illustrated in the example computing system 500.

The present disclosure may be described in the general context of non-transitory computer-executable instructions, such as programs, being executed by a computer. Generally, programs include applications, routines, objects, components, data structures, etc., that perform particular tasks or implement particular abstract data types. The present disclosure may also be practiced in distributed computing environments where tasks are performed by remote processing devices that are linked through a communications network. In a distributed computing environment, programs may be located in both local and remote non-transitory computer-storage media including memory-storage devices.

What is claimed is:

1. A method to determine a probable root cause of a performance issue affecting a Hypertext Transfer Protocol (HTTP) transaction, the method comprising:
   processing, using a processor, a set of calls for the HTTP transaction, wherein each call of the set of calls is associated with a set of parameters;
   determining, using the processor, that a performance metric associated with the HTTP transaction is below a predetermined level; and
   in response to determining that the performance metric is below the predetermined level, level:
      identifying, using that the processor, a first plurality of calls of the set of calls for the HTTP transaction associated with the performance issue and a second plurality of calls for the HTTP transaction not associated with the performance issue;
      identifying, using the processor, one or more parameters common to the set of parameters associated with each call of the first plurality of calls associated with the performance issue;
      determining, using the processor, each of the identified one or more parameters common to the set of parameters associated with each call of the first plurality of calls are not in the set of parameters associated with each call of the second plurality of calls; and
      based on determining each of the identified one or more parameters common to the set of parameters associated with each call of the first plurality of calls are not in the set of parameters associated with each call of the second plurality of calls, determining that the identified one or more parameters common to the set of parameters associated with each call of the first plurality of calls are the probable root cause of the performance issue affecting the HTTP transaction.

2. The method of claim 1, further comprising:
   identifying a common attribute value among calls of the first plurality of calls;
   determining the common attribute value is not found in calls of the second plurality of calls; and
   based on determining the common attribute value is not found in the calls of the second plurality of calls, determining the common attribute value is a second probable root cause of the performance issue.

3. The method of claim 2, wherein the common attribute value is one of a long name value, a long word value, a long value, a date value, a range value, a number value, a Boolean value, a color value, and a language value.

4. The method of claim 1, further comprising notifying a user of the probable root cause.

5. The method of claim 4, wherein notifying the user of the probable root cause comprises displaying the probable root cause in a user interface.

6. The method of claim 1, wherein determining, using the processor, each of the identified one or more parameters common to the set of parameters associated with each call of the first plurality of calls are not in the set of parameters associated with each call of the second plurality of calls comprises identifying calls taking longer than an amount of time to execute, wherein the amount of time is one of a predetermined amount of time, a user defined amount of time, and associated with a jump in usage between the first plurality of calls and the second plurality of calls.

7. The method of claim 1, wherein determining, using the processor, each of the identified one or more parameters common to the set of parameters associated with each call of the first plurality of calls are not in the set of parameters associated with each call of the second plurality of calls comprises automatically tracing the set of calls for the HTTP transaction across one or more of multiple frontend application servers and multiple backend application servers.

8. A non-transitory computer-usable storage medium having instructions embodied therein that when executed cause a computer system to perform a method to determine a probable root cause of a performance issue affecting a Hypertext Transfer Protocol (HTTP) transaction, the method comprising:
   processing a set of calls for the HTTP transaction, wherein each call of the set of calls is associated with a set of parameters;
   determining that a performance metric associated with the HTTP transaction is below a predetermined level; and
   in response to determining that the performance metric is below the predetermined level:
      identifying a first plurality of calls of the set of calls for the HTTP transaction associated with the performance issue and a second plurality of calls for the HTTP transaction not associated with the performance issue;
      identifying one or more parameters common to the set of parameters associated with each call of the first plurality of calls associated with the performance issue;
      determining that each of the identified one or more parameters common to the set of parameters associated with each call of the first plurality of calls are not in the set of parameters associated with each call of the second plurality of calls; and
      based on determining that each of the identified one or more parameters common to the set of parameters associated with each call of the first plurality of calls are not in the set of parameters associated with each call of the second plurality of calls, determining that the identified one or more parameters common to the set of parameters associated with each call of the first plurality of calls are the probable root cause of the performance issue affecting the HTTP transaction.

9. The non-transitory computer-usable storage medium of claim 8, the method further comprising:
   identifying a common attribute value among the calls of the first plurality of calls;
   determining the common attribute value is not found in the calls of the second plurality of calls; and
   based on determining the common attribute value is not found in the calls of the second plurality of calls, determining the common attribute value is a second probable root cause of the performance issue.

10. The non-transitory computer-usable storage medium of claim 9, wherein the common attribute value is one of a long name value, a long word value, a long value, a date value, a range value, a number value, a Boolean value, a color value, and a language value.

11. The non-transitory computer-usable storage medium of claim 8, the method further comprising notifying a user of the probable root cause.

12. The non-transitory computer-usable storage medium of claim 11, wherein notifying the user of the probable root cause comprises displaying the probable root cause in a user interface.

13. The non-transitory computer-usable storage medium of claim 8, wherein determining each of the identified one or more parameters common to the set of parameters associated with each call of the first plurality of calls are not in the set of parameters associated with each call of the second plurality of calls comprises automatically tracing the set of calls for the HTTP transaction across one or more of multiple frontend application servers and multiple backend application servers.

14. The non-transitory computer-usable storage medium of claim 8, wherein determining each of the identified one or more parameters common to the set of parameters associated with each call of the first plurality of calls are not in the set of parameters associated with each call of the second plurality of calls comprises identifying calls taking longer than an amount of time to execute, wherein the amount of time is one of a predetermined amount of time, a user defined amount of time, and associated with a jump in usage between the first plurality of calls and the second plurality of calls.

15. A system to determine a probable root cause of a performance issue affecting a Hypertext Transfer Protocol (HTTP) transaction, the system comprising:
   a server with a processor and memory configured to:
      process a set of calls for the HTTP transaction, wherein the set of calls comprises one or more of a request message and a response message, wherein each call of the set of calls is associated with a set of parameters, and wherein the set of parameters associated with each call comprises components of a header section of one or more of the request message and the response message;
      determine that a performance metric associated with the HTTP transaction is below a predetermined level;
      in response to determining that the performance metric is below the predetermined level:
         identify a first plurality of calls of the set of calls for the HTTP transaction associated with the performance issue and a second plurality of calls for the HTTP transaction not associated with the performance issue;
         identify one or more parameters common to the set of parameters associated with each call of the first plurality of calls associated with the performance issue;
         determine that each of the identified one or more parameters common to the set of parameters associated with each call of the first plurality of calls are not in the set of parameters associated with each call of the second plurality of calls; and
         based on determining that each of the identified one or more parameters common to the set of parameters associated with each call of the first plurality of calls are not in the set of parameters associated with each call of the second plurality of calls, determine that the identified one or more parameters common to the set of parameters associated with each call of the first plurality of calls are the probable root cause of the performance issue affecting the HTTP transaction.

16. The system of claim 15, wherein the processor and memory are further configured to notify a user of the probable root cause.

17. The system of claim 16, wherein notifying the user of the probable root cause comprises displaying the probable root cause in a user interface.

18. The system of claim 15, wherein the processor and server are further configured to:
   identify a common attribute value among the calls of the first plurality of calls;
   determine the common attribute value is not found in the calls of the second plurality of calls; and based on determining the common attribute value is not found in the calls of the second plurality of calls, determine the common attribute value is a second probable root cause of the performance issue.

19. The system of claim 15, wherein determining each of the identified one or more parameters common to the set of parameters associated with each call of the first plurality of calls are not in the set of parameters associated with each call of the second plurality of calls comprises identifying calls taking longer than an amount of time to execute, wherein the amount of time is one of a predetermined amount of time, a user defined amount of time, and associated with a jump in usage between the first plurality of calls and the second plurality of calls.

20. The system of claim 15, wherein determining each of the identified parameters common to the set of parameters associated with each call of the first plurality of calls are not in the set of parameters associated with each call of the second plurality of calls comprises automatically tracing the set of calls for the HTTP transaction across one or more of multiple frontend application servers and multiple backend application servers.

\* \* \* \* \*